US005761807A

United States Patent [19]

Schuez et al.

[11] Patent Number: 5,761,807

[45] Date of Patent: Jun. 9, 1998

[54] METHOD OF MANUFACTURE OF A MULTIPLE FINNED TUBE

[75] Inventors: Gerhard Schuez, Voehringen; Manfred Knab, Dornstadt-Bollingen, both of Germany

[73] Assignee: Wieland-Werke AG, Ulm, Germany

[21] Appl. No.: 655,981

[22] Filed: May 31, 1996

Related U.S. Application Data

[62] Division of Ser. No. 465,758, Jun. 6, 1995.

[30] Foreign Application Priority Data

Jun. 15, 1994 [DE] Germany .......................... 44 20 756.5

[51] Int. Cl.[6] ...................................................... B23P 15/26

[52] U.S. Cl. ........................................ 29/890.048; 29/727

[58] Field of Search ...................... 29/726, 727, 890.048; 72/98; 165/184

[56] References Cited

U.S. PATENT DOCUMENTS

| | | | |
|---|---|---|---|
| 3,855,832 | 12/1974 | Novak | 72/84 |
| 4,692,978 | 9/1987 | Cunningham et al. | 72/98 |
| 4,765,058 | 8/1988 | Zohler | 29/727 |

*Primary Examiner*—Irene Cuda
*Attorney, Agent, or Firm*—Flynn, Thiel, Boutell & Tanis, P.C.

[57] ABSTRACT

A metallic finned tube, in particular for heat exchangers, which includes multiple integral fins helically extending on the outside, with the n fin run starts starting at the start of the tube and are evenly distributed around the tube periphery. The finned tube has a number of fin run starts n≧4 with at least one group having at least two side-by-side oriented fin run starts ($A_1$, $A_2$ or rather $A_3$, $A_4$ . . . ).

15 Claims, 5 Drawing Sheets

METHOD OF MANUFACTURE OF A MULTIPLE FINNED TUBE

This is a division of Ser. No. 08/465,758, filed Jun. 6, 1995.

FIELD OF THE INVENTION

The invention relates to a metallic finned tube, in particular for heat exchangers or the like and including multiple integral fins extending helically on the outside surface thereof.

BACKGROUND OF THE INVENTION

Finned tubes with one or multiple fins extending helically on the outside surface thereof are roll formed out of the tube wall by means of rolling tools which have rolling disks arranged on tool shafts (compare U.S. Pat. Nos. 1,865,575 and 3,327,512 and FIG. 1).

Whereas, in the case of thread rolling on rods or rather thick-wall tubes, apparatus with two oppositely arranged rolling tools is often used. Apparatus with three or four rolling tools evenly distributed around the tube periphery are used for rolling of finned tubes (compare FIGS. 2*a* and 2*b*).

The heat transfer characteristic of finned tubes depends among others on the enlargement of the surface area achieved by the forming of fins. The fin spacing on finned tubes has therefore been further and further reduced during the last several years. Thus, the surface area achieved by the forming of fins continues to increase. With a fin spacing of 0.63 mm (corresponding to 1574 fins per m) a surface area is produced which is approximately four times the area of the smooth tube. During uses with a phase change, namely in evaporators and condensers, an additional intensification of the heat transfer, in particular in tubes with small fin spacings, is achieved by surface forces and capillary effects.

SUMMARY OF THE INVENTION

The basic purpose of the invention is to improve the heat-transfer performance of conventional finned tubes using an assured economical method of manufacture of the finned tubes.

The purpose is attained according to the invention in such a manner that at a number of fin run starts $n \geqq 4$ at least one group is formed which has at least two-side-by-side oriented fin starts ($A_1$, $A_2$ or rather $A_3$, $A_4$ . . . ). That is, the number of fins is at least four, and begin at locations spaced evenly about a circumference of the tube, with at least one group of side-by-side helical fins being formed which begin at substantially the same circumferential location on the tube exterior.

According to preferred embodiments of the finned tube embodying the invention, groups of two, three or four fin run starts each are formed.

For example, in an apparatus with three rolling tools and a six-start rolling, there result three groups of two side-by-side oriented fin run starts, as is shown in FIG. 3*a*. In contrast to this, in a conventional apparatus using six rolling tools each with a single fin start, there would result only six fin run starts (FIG. 3*b*).

The invention is particularly suited for high-performance finned tubes, in which the fin tips are on the outside either upset by constructing thickened ends, are grooved, and are possibly after the grooving split to form cavities and/or are laterally bent and/or upset.

The fin spacing in the finned tubes embodying the invention is preferably $t_R$=0.25–1.50 mm and the fin height $h_R \leqq 1.60$ mm.

To intensify the heat transfer, it is possible to combine the inventively constructed outside of the finned tube with different structures on the inside of the tube. It is thereby preferably suggested that the inside surface of the tube has helically extending inner fins, the spacing of which, measured perpendicularly with respect to the inner fins, is $t_i$=0.5–3 mm, the height of which is $h_i$=0.2–0.5 mm and the helix angle of which is $\theta$=25°–70°.

The pitch angle of the inner fins (9) is according to a further embodiment of the invention $\theta$=5°–25°, the relationship of the height of the inner fins (9) to the inside diameter of the tube $h_i/D_i$=0.02–0.03, the medium flank spacing between the inner fins (9) W=0.15–40 mm and the vertex angle of the inner fins $\gamma$=30°–6° (W and $\gamma$ are measured in a cross-sectional plane oriented perpendicular to the tube axis).

The inside surface of the tube has, according to another alternative embodiment, corrugations which can also be interrupted and the spacing of which, viewed in longitudinal direction of the tube, preferably results from fin spacing $t_R$ and the number of fin run starts n.

Projections are furthermore advisable on the inside surface of the tube, which projections are formed by two oppositely crossing inner helical fins.

Fins were originally rolled with one start on the outside surface of a tube. To increase the performance of a rolling apparatus a consideration of the rolling speed $W_{walz}$ is offered. The rolling speed is calculated as follows:

$$W_{walz} = \pi \cdot \tan(\alpha) \cdot D_{sch} * W \qquad \text{Gl. (1),}$$

with $W_{walz}$ being the rolling speed, $\alpha$ the lead or skew angle, $D_{sch}$ the diameter of the largest rolling disk and W the speed of the tool shafts.

An increase of the speed W has thereby technical limits. $D_{sch}$ has geometrical limits; since the maximum diameter results from the condition that the rolling disks of adjacent tool shafts may not contact one another during operation.

Thus, an increase of the $W_{walz}$ can be achieved only through the lead or skew angle $\alpha$. For tan $\alpha$ is valid the relationship:

$$\tan \alpha = \frac{n \cdot t_R}{\pi \cdot D_{Kern}}, \qquad \text{Gl. (2)}$$

with n being the number of fin run starts, $t_R$ the fin spacing and $D_{Kern}$ the core diameter of the finned tube. Thus, with a pregiven fin geometry (spacing and core diameter) the lead or skew angle can only be enlarged by increasing the number of fin run starts.

First two-start finned tubes were rolled on the rolling apparatus using three rolling tools (compare U.S. Pat. No. 3,383,893).

Later on, three-start rolling took place on such apparatus (compare U.S. Pat. No. 3,481,394). This patent also mentions the possibility of rolling with six run starts by using apparatus with six rolling tools. It is characteristic for the state of the art that either all rolling tools run in one common fin lead (one and two-start rolling) or in a borderline case each rolling tool forms a separate fin run start (three or rather four-start rolling). With this a limit has been reached since it was assumed that each rolling tool can at a maximum produce only one fin run start.

BRIEF DESCRIPTION OF THE DRAWINGS

The invention will be discussed in greater detail in connection with the following exemplary embodiments and with reference to the accompanying drawings, in which.

DETAILED DESCRIPTION

Figure 1:
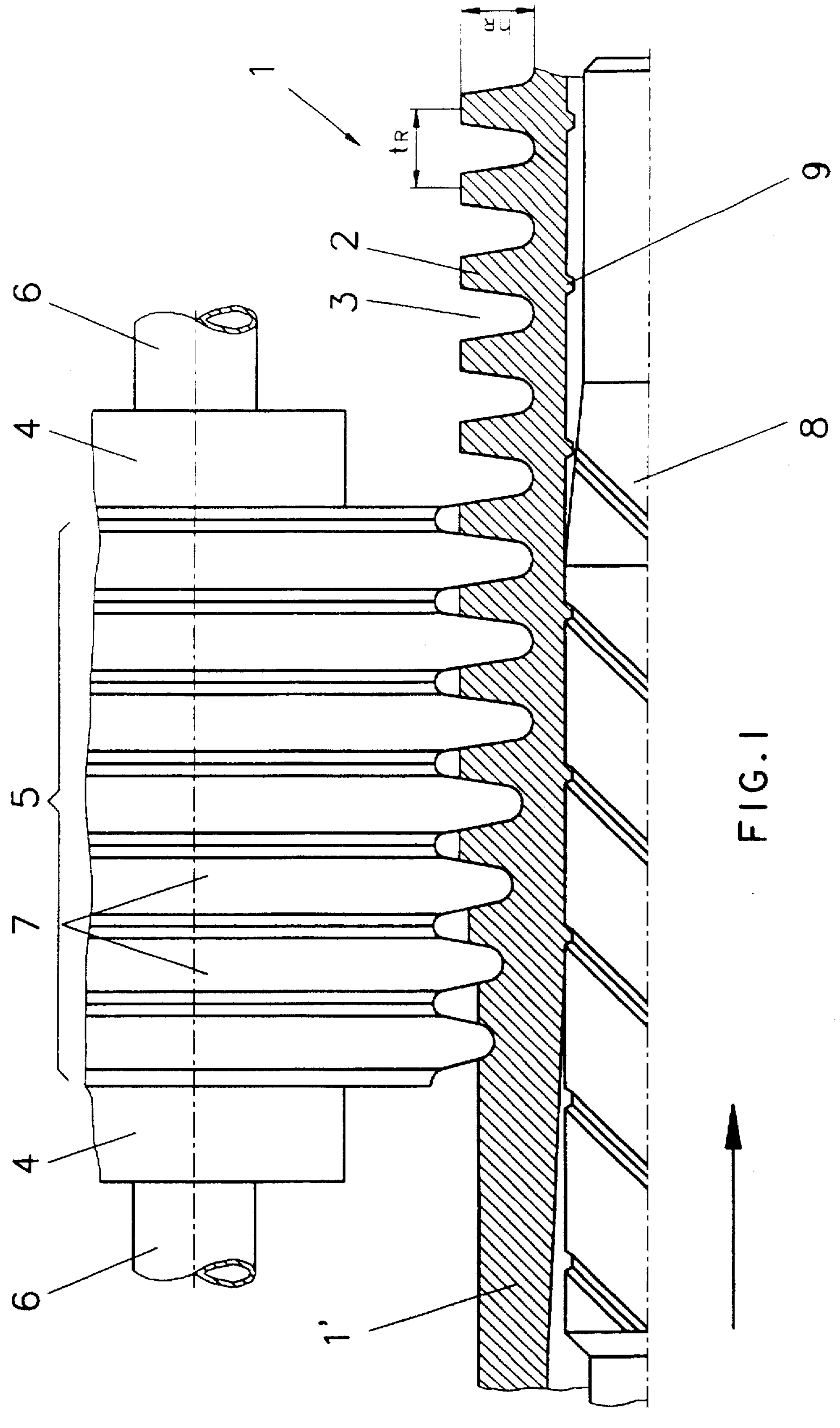
FIG. 1 is a longitudinal sectional view of a fin forming tool embodying the invention.

FIG. 1 shows schematically a finned tube 1 embodying the invention, on the outside of which finned tube fins 2 are integrally formed and extend helically, between which fins a groove 3 is formed. The fins 2 have a height $h_R$; the fin spacing (spacing from fin center to fin center) is identified by the characters $t_R$.

Figure 2B:
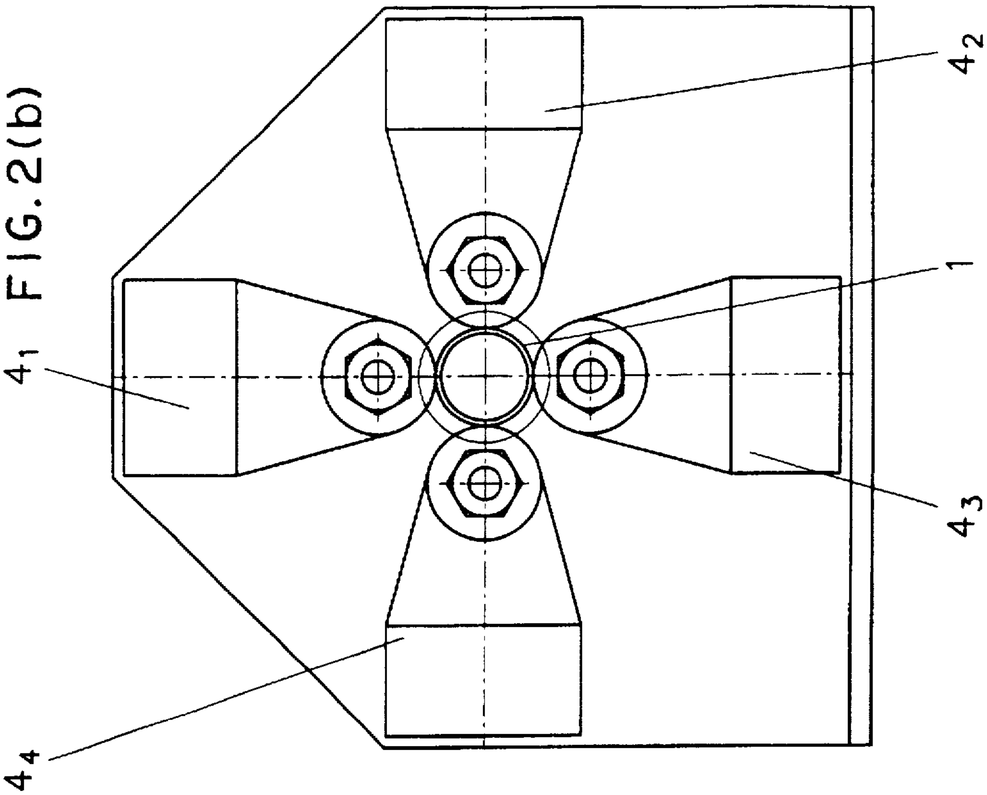
FIGS. 2(*a*) and 2(*b*) are end views of two tool holder arrangements.
Figure 2A:
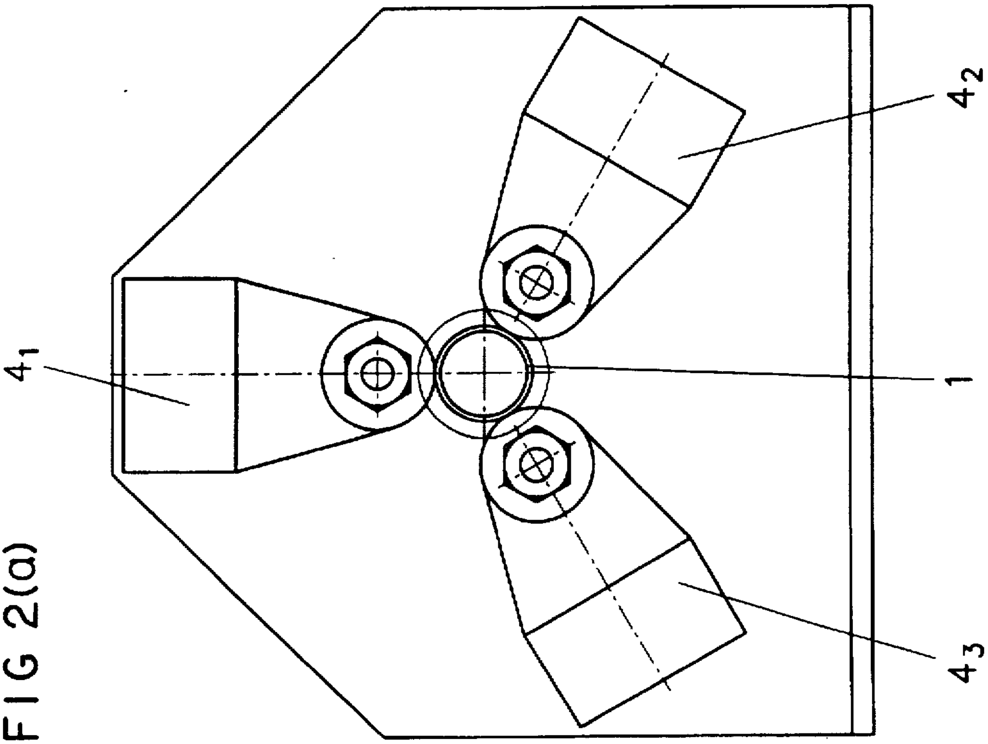

The finned tube 1 of the invention is manufactured by a rolling operation (see U.S. Pat. Nos. 1,865,575 and 3,327,512 the disclosures therein being incorporated by reference) by means of the apparatus illustrated in FIGS. 1 and 2*b*.

An apparatus is utilized which consists of N=4 tool holders 4 ($4_1/4_2/4_3/4_4$) all integrated to form a rolling tool 5 (FIG. 1 shows only one tool holder 4. However, it is, for example, possible to use three tool holders or more than four tool holders 4). The tool holders 4 are each arranged offset at $\beta$=360°/N around the periphery of the finned tube 1. The tool holders 4 are conventionally supported for radial movement. The tool holders are each arranged in a stationary (not illustrated) rolling head (according to another variation the tube is moved only axially with the rolling head rotating).

A smooth-surfaced tube 1' moves in arrow direction X into the apparatus and is rotatably driven by the rolling or rotating tools 5 arranged around the periphery thereof, with the shafts 6 of the rolling tools 5 extending at a lead or skewed angle and a tapered angle with respect to the tube axis. The lead angle $\alpha$ of the shafts 6 is adjusted corresponding with the desired number of fin run starts n according to the relationship G1. (2). The rolling tools 5 consist in a conventional manner of several rolling disks 7 arranged side-by-side on the shafts 6, the diameters of which rolling disks increase in arrow direction X. The circumferentially arranged rolling tools 5 form the helically extending fins 2 out of the tube wall of the smooth-surfaced tube 1', with the smooth-surfaced tube 1' being here internally supported by a profiled rolling mandrel 8. Thus, the helically extending fins identified by the reference numeral 9 are created at the same time on the inside of the tube 1.

Figure 3A:
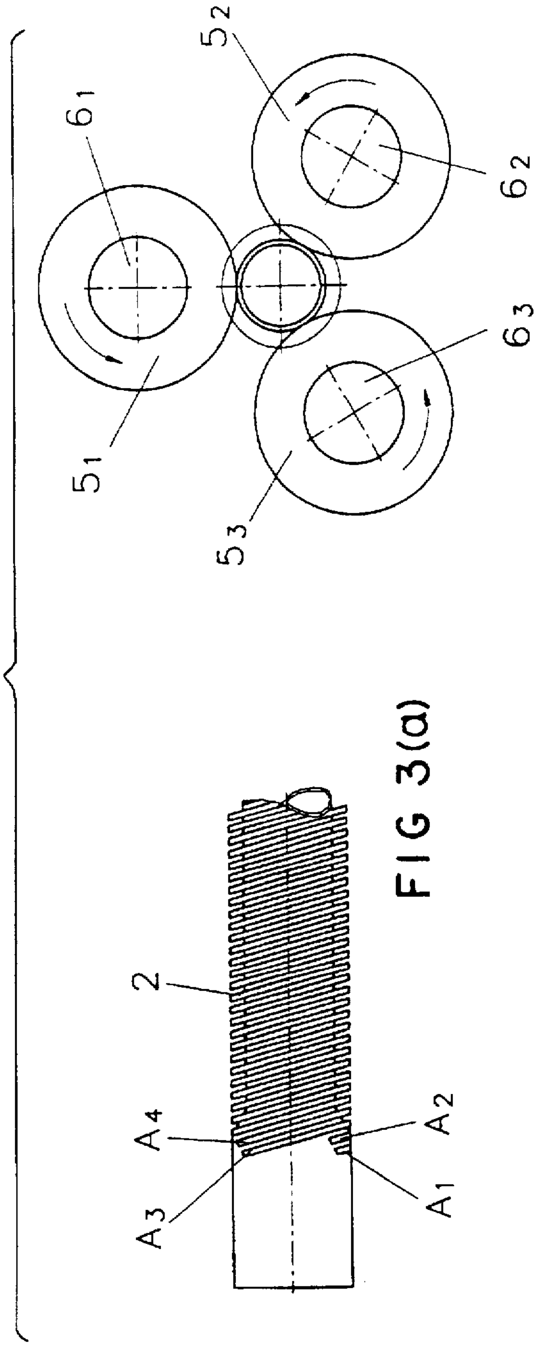
FIGS. 3(*a*) and 3(*b*) are exemplary tool and tube arrangements.
Figure 3B:
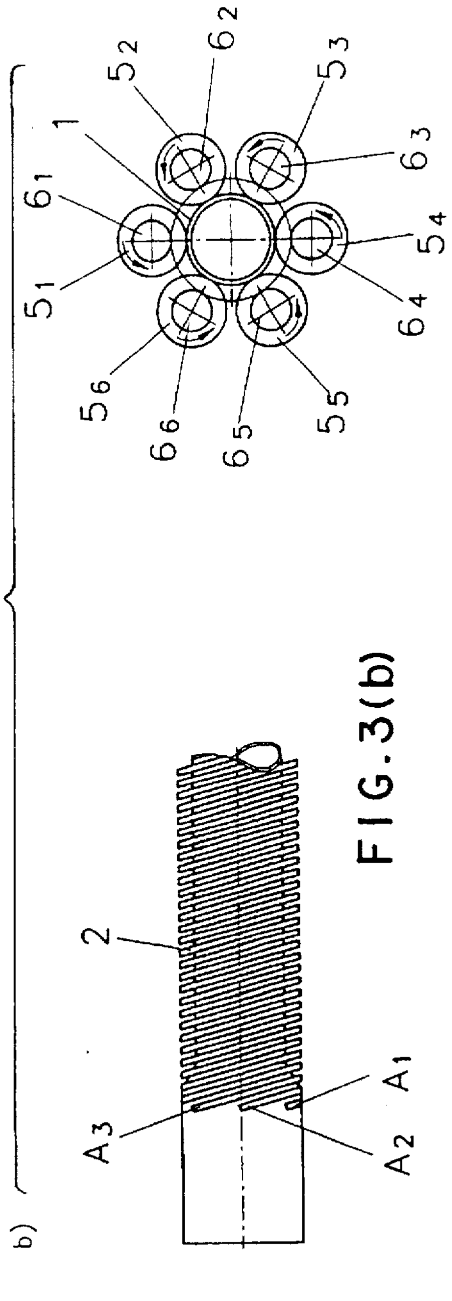

The rolling method and the start of a group of fins can be clearly recognized in FIG. 3*a* on the tube periphery or rather at the transition areas between finned and nonfinned tube sections since the rolling disk engagement during immersion into the tube wall occurs in groups. FIGS. 3*a* and 3*b* show schematically the difference between the rolling method of the invention and the conventional rolling method using the example in FIG. 3*a* of a six-start rolling. According to FIG. 3*a*, there are three groups each having two side-by-side oriented fin run starts $A_1$, $A_2$ or $A_3$, $A_4$ or rather, $A_5$, $A_6$ (the latter group is not shown) evenly distributed over the tube periphery, whereas according to FIG. 3*b* there are six individual fin run starts $A_1$, $A_2$, $A_3$, $A_4$, $A_5$, $A_6$ ($A_4$–$A_6$ are not shown) arranged on the tube periphery. (Moreover, FIGS. 3*a*, 3*b* use the present reference numerals, partly, with subscripts).

Numerical Example

Finned tubes 1 with a fin pitch $t_R \approx 0.53$ mm were, according to the above described method, manufactured with eight fin starts using an apparatus having four rolling tools 5. The fin diameter is in this type of tube D=19 mm, the fin height $h_R$=0.95 mm. A helical inner fin structure was produced during the same operation on the inside surface of the fin tube with approximately 40 inner fins 9, which extend at a helix angle $\theta$=45° with respect to the tube axis.

Another realization is based on the eight-start rolling of a finned tube 1 with a pitch of $t_R \approx 0.64$ mm with a similar inner structure as aforedescribed.

Figure 4:
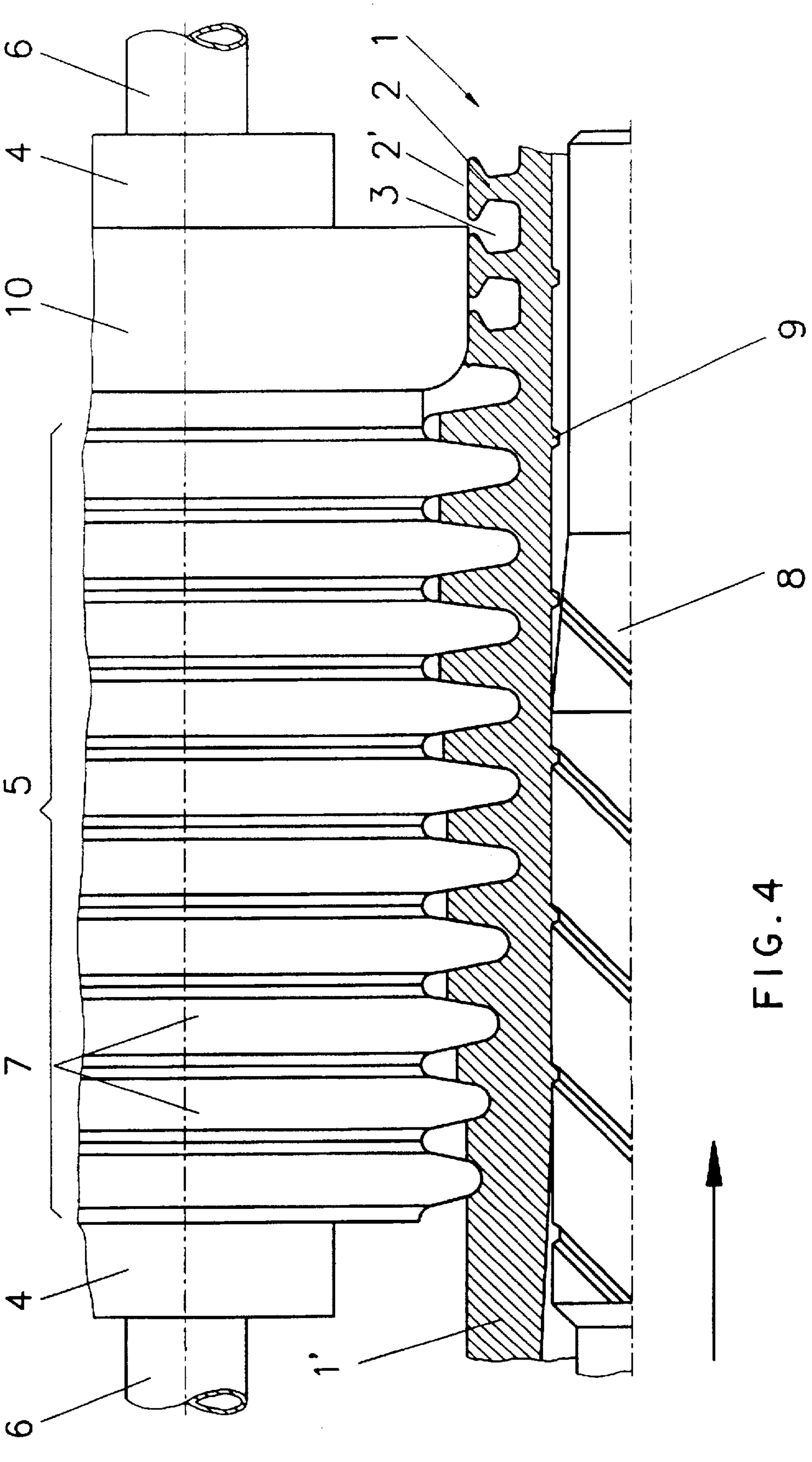
FIG. 4 illustrates a further tool arrangement for enlarging the surface area of the fin tips.

FIG. 4 shows in addition to FIG. 1 a rolling apparatus in which the tips of the fins are upset to form T-shaped fin tips 2'. For this task, one upsetting disk 10 is additionally integrated into the tool holder 4.

Figure 5:
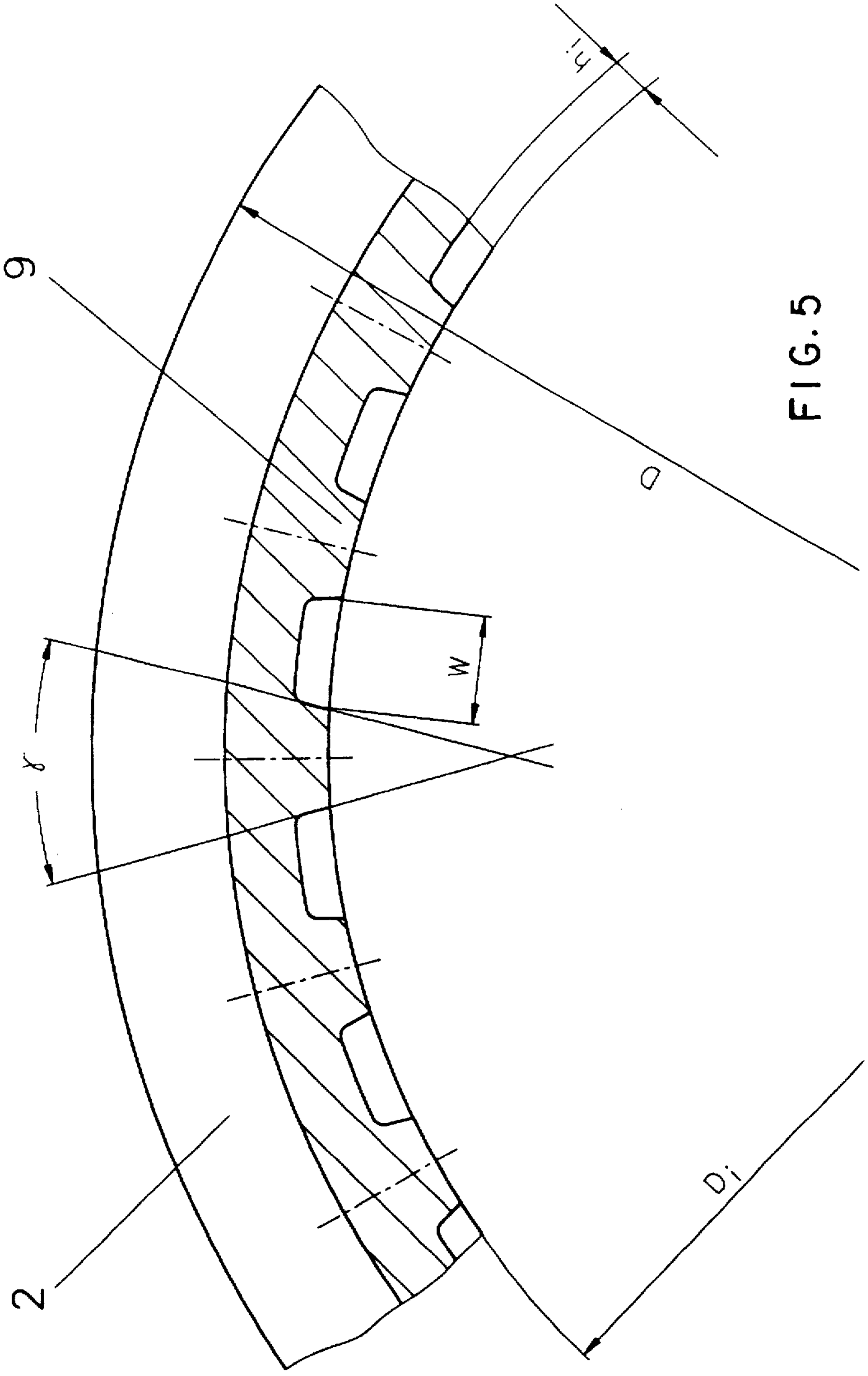
FIG. 5 is a enlarged fragment of a tube having both external and internal fins thereon.

To explain the inner structure of the tube 1, FIG. 5 shows a partial cross section of the tube in a plane that is perpendicular with respect to the tube axis, into which the sizes of the fin diameter D, the inside diameter $D_i$, the fin height $h_i$, the mean flank spacing W and the vertex angle a of the inner fins 9 are illustrated.

The embodiments of the invention in which an exclusive property or privilege is claimed are defined as follows:

1. A method for the manufacture of a fin tube, comprising the steps of:

a) forming helical extending fins on the outer surface of a smooth-surfaced tube by moving the fin material from the tube wall radially outwardly by means of a rolling operation;

b) using, during the rolling operation, at least two rolling tools resting on the tube, which rolling tools consist of several side-by-side lying rolling disks with different diameters, which can be radially pressed into the tube wall and the shafts of which are arranged during the fin creation under a predetermined lead angle $\alpha$ with respect to the tube axis, which angle corresponds with the desired number of fin run starts n;

c) supporting the smooth-surfaced tube on a rolling mandrel lying therein;

d) rotating and/or axially advancing the fin tube by the rolling forces corresponding with the fins being created, with the fins being formed to an increasing height out of the otherwise nondeformed smooth-surfaced tube; and e) selecting a number of fin run starts n to be n>N, wherein N is the existing number of the rolling tools so that at least one of the rolling tools produces more than one fin run start.

2. The method according to claim 1, wherein each rolling tool produces two fin run starts.

3. The method according to claim 1, wherein each rolling tool produces three fin run starts.

4. The method according to claim 1, wherein each rolling tool produces four fin run starts.

5. The method according to claim 1, wherein the fin tips are deformed in at least one step by radial forces.

6. The method according to claim 1, wherein notches are pressed into the fin tips by at least one notch disk.

7. The method according to claim 6, wherein the finned tips are split in direction of the fins and are bent by axial forces and are deformed by radial forces.

8. The method according to claim 1, wherein the smooth-surfaced tube is supported by a profiled rolling mandrel.

9. The method according to claim 1, wherein after the forming of the fins the groove between the fins is continuously pressed inwardly by radial forces, with no support by an inner mandrel taking place in this area so that tube wall material for forming of corrugations are shifted to the inside of the tube.

10. The method according to claim 9, wherein not all rolling tools, which are being used, have a corrugating disk.

11. The method according to claim 6, wherein the finned tips are split in direction of the fins.

12. The method according to claim 6, wherein the finned tips are bent by axial forces.

13. The method according to claim 6, wherein the finned tips are deformed by radial forces.

14. The method according to claim 1, wherein after the forming of the fins the groove between the fins is only at points pressed inwardly by radial forces, with no support by an inner mandrel taking place in this area so that tube wall material for forming of corrugations are shifted to the inside of the tube.

15. The method according to claim 14, wherein not all rolling tools, which are being used, have a corrugating disk.

* * * * *